(12) United States Patent
Vollmer et al.

(10) Patent No.: US 8,408,349 B1
(45) Date of Patent: Apr. 2, 2013

(54) ELECTRIC BICYCLE

(71) Applicant: Faraday Bicycles, Inc., Palo Alto, CA (US)

(72) Inventors: Adam Patrick Vollmer, Palo Alto, CA (US); Kyle J. Doerksen, Mountain View, CA (US); Adam Reineck, San Francisco, CA (US); Nathaniel David Ginzton, Boise, ID (US)

(73) Assignee: Faraday Bicycles, Inc., Palo Alto, CA (US)

( * ) Notice: Subject to any disclaimer, the term of this patent is extended or adjusted under 35 U.S.C. 154(b) by 0 days.

(21) Appl. No.: 13/625,666

(22) Filed: Sep. 24, 2012

Related U.S. Application Data

(60) Provisional application No. 61/538,118, filed on Sep. 22, 2011.

(51) Int. Cl.
*B62M 6/40* (2010.01)
*B62M 6/90* (2010.01)

(52) U.S. Cl. .................. 180/207.3; 180/206.1; 180/220; 180/68.5

(58) Field of Classification Search .................. 180/220, 180/206.1–206.8, 207.3, 68.5, 65.1, 65.6, 180/65.8; 280/281.1, 288.4
See application file for complete search history.

(56) References Cited

U.S. PATENT DOCUMENTS

| | | | | |
|---|---|---|---|---|
| 1,306,146 | A * | 6/1919 | Hawthorne | 224/426 |
| 3,800,898 | A * | 4/1974 | Griffin | 180/206.5 |
| 5,865,267 | A * | 2/1999 | Mayer et al. | 180/206.5 |
| 6,152,250 | A * | 11/2000 | Shu-Hsien | 180/220 |
| 6,453,262 | B1 | 9/2002 | Kitamura | |
| 7,150,339 | B2 | 12/2006 | Liao et al. | |
| 7,604,079 | B2 * | 10/2009 | Pittman | 180/205.5 |
| 7,934,576 | B2 * | 5/2011 | Munksoe | 180/220 |
| 2004/0163870 | A1 * | 8/2004 | Liao et al. | 180/220 |
| 2005/0029033 | A1 * | 2/2005 | Rip et al. | 180/220 |
| 2005/0126840 | A1 * | 6/2005 | Lin | 180/205 |
| 2005/0217910 | A1 * | 10/2005 | Yonehana et al. | 180/68.5 |
| 2006/0070785 | A1 * | 4/2006 | Ducharme | 180/220 |

OTHER PUBLICATIONS

Dec. 14, 2012, International Search Report of the International Searching Authority from the U.S. Receiving Office, in PCTUS2012056935.
Dec. 14, 2012, Written Opinion of the International Searching Authority from the U.S. Receiving Office, in PCTUS2012056935.

\* cited by examiner

*Primary Examiner* — Anne Marie M Boehler
(74) *Attorney, Agent, or Firm* — Kolisch Hartwell, P.C.

(57) ABSTRACT

An electric bicycle and electric bicycle frame including batteries stored in a pair of substantially parallel top tubes. In some cases, the top tubes extend rearward of the bicycle seat tube, and an electronics housing may be disposed between the rearward extending top tube portions.

17 Claims, 4 Drawing Sheets

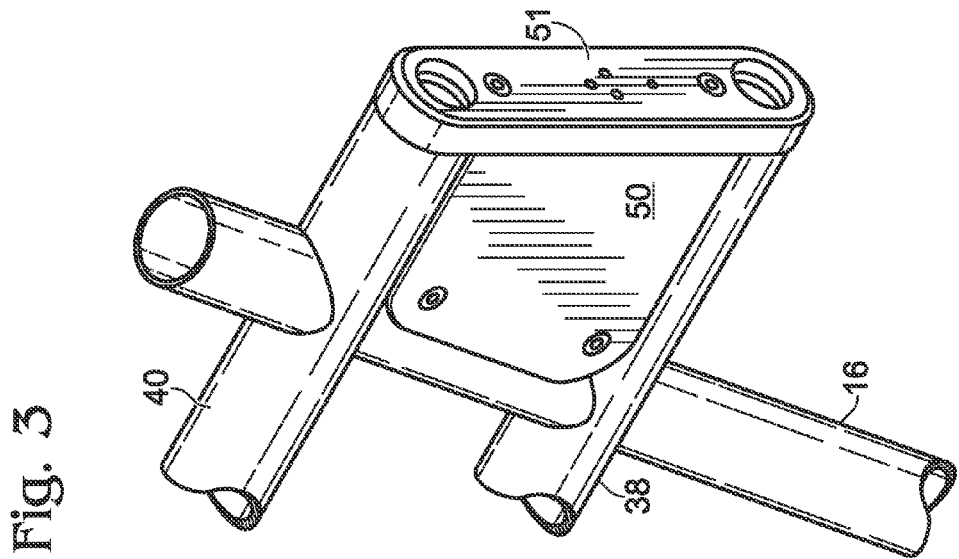
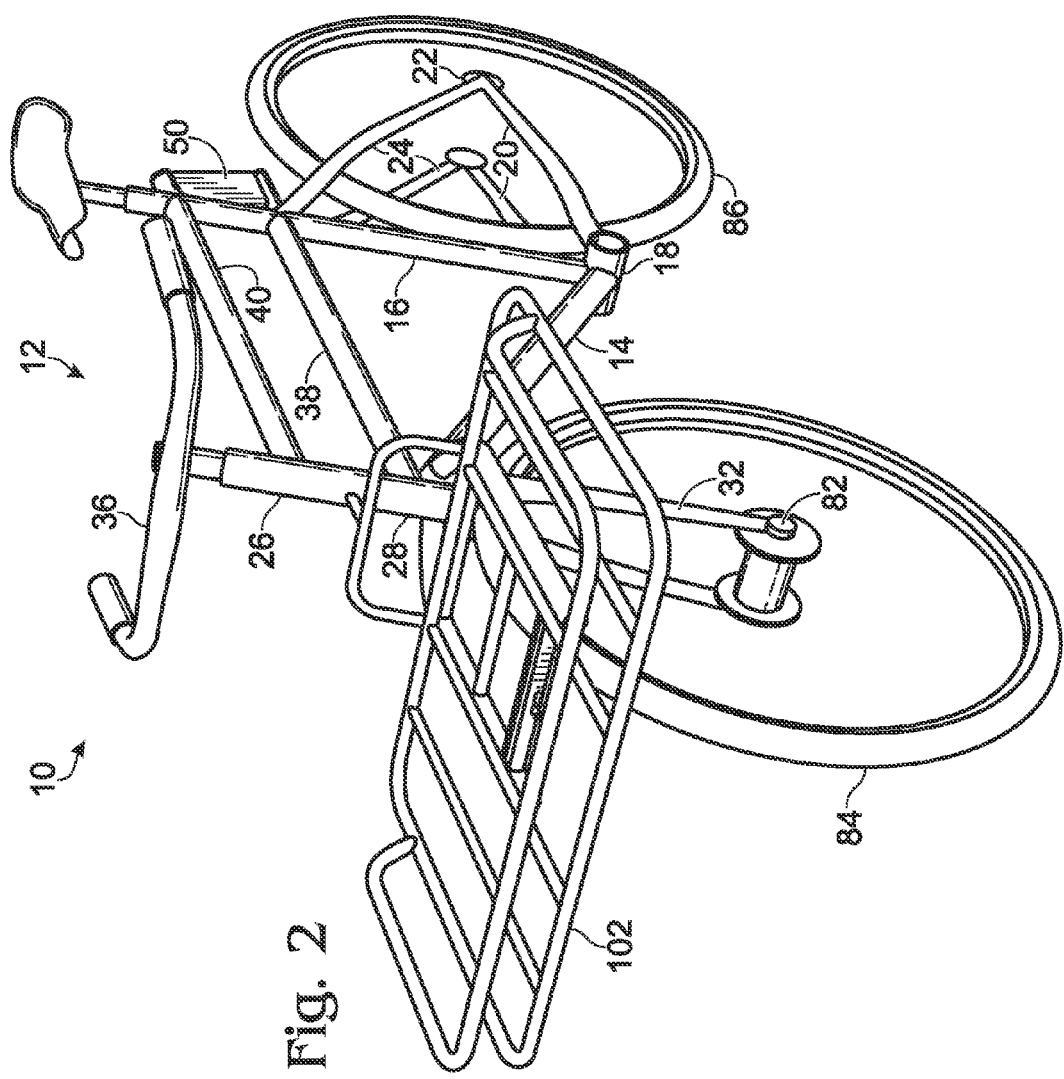

__US 8,408,349 B1__

ELECTRIC BICYCLE

CROSS-REFERENCE TO RELATED APPLICATION

This application claims priority to U.S. Provisional Patent Application Ser. No. 61/538,118, filed Sep. 22, 2011, which is hereby incorporated by reference.

BACKGROUND

Conventional electric bicycles typically rely on a battery pack and electronics incorporated into one or more housings that are attached by various means to the outside of the bicycle frame. External batteries and electronics have drawbacks including, but not limited to, adding extra weight, consuming storage space on the bike, negatively affecting the distribution of weight on the bike, and hurting the aesthetics of the bicycle design.

In addition, existing electrical assist algorithms for electrical bicycles typically do not take into account the continuity of the bicycle's speed and acceleration, resulting in bursts of power from the electric motor that may be unexpected and/or excessively forceful and that may compromise the rider's safety or enjoyment when riding the bicycle. Accordingly, improvements to electric bicycles are needed, including improved battery and electronics configurations and improved electrical assist algorithms.

SUMMARY

The present teachings disclose aspects of an electric bicycle and electric bicycle frame including batteries stored in a pair of substantially parallel top tubes. In some cases, the top tubes extend rearward of the bicycle seat tube, and an electronics housing may be disposed between the rearward extending top tube portions.

BRIEF DESCRIPTION OF DRAWINGS

FIG. 2 is an isometric view of the electric bicycle of FIG. 1.

FIG. 3 is an isometric view of a rear portion of the frame of the electric bicycle of FIGS. 1-2, showing further details of an electronics housing disposed between rearward extending portions of the bicycle top tubes.

DETAILED DESCRIPTION

The present teachings generally relate to electric bicycles having batteries integrated into a bicycle frame and configured to be electrically connected to an electronics housing in a particular manner. The present teachings also relate to other aspects of an electric bicycle, including a novel front rack and accessory mounting system.

Figure 1:
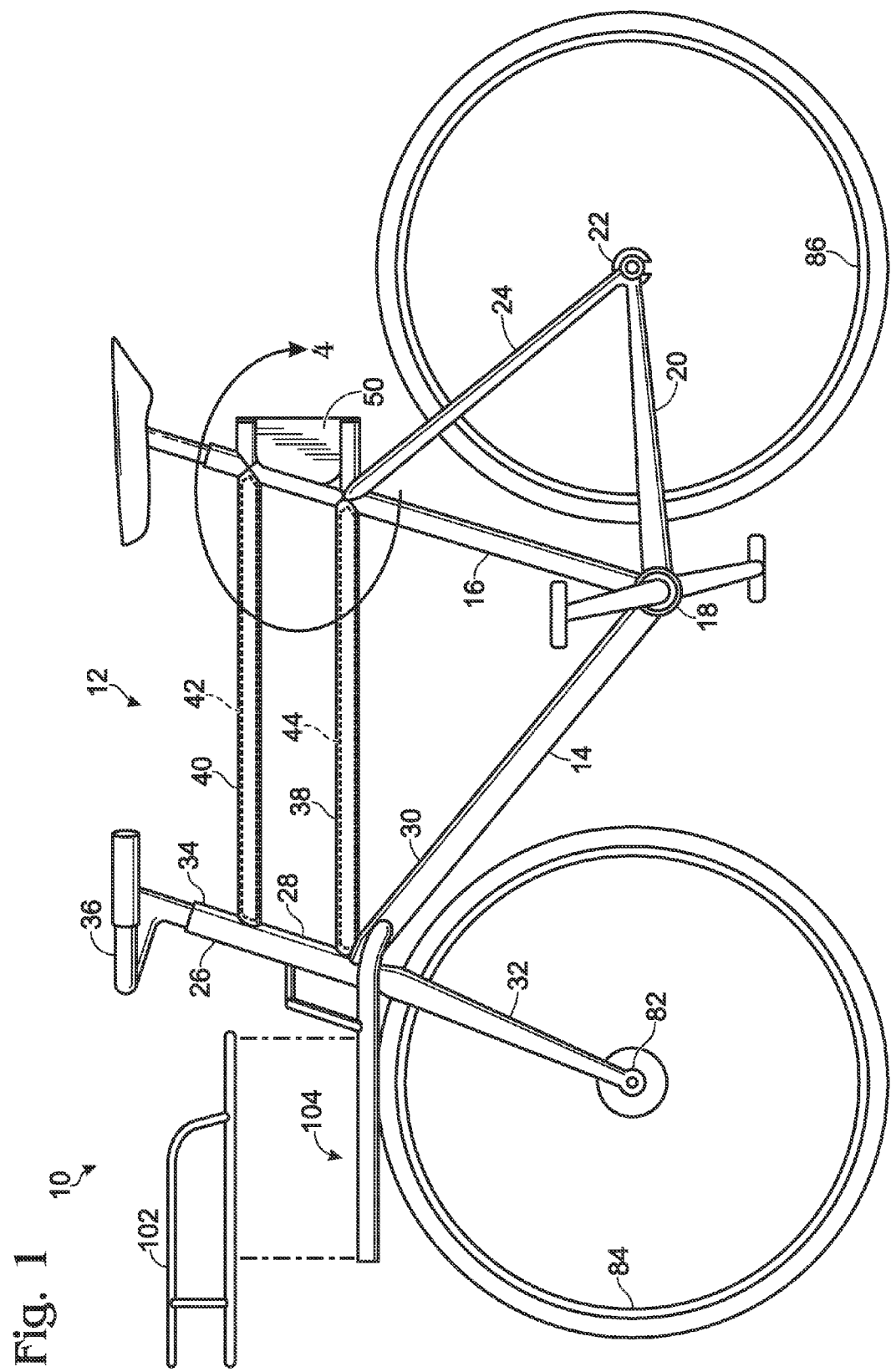
FIG. 1 is a side elevational view of an electric bicycle, according to aspects of the present teachings.

FIGS. 1-2 schematically depict an electric bicycle, generally indicated at 10, according to aspects of the present teachings. Bicycle 10 includes a frame, generally indicated at 12, having various tubes that are joined together by any of a number of standard methods known in the art, such as welding, brazing, molding and/or the like. The particular method of joining the tubes depends to a large degree on the chosen frame material. Typical materials used to construct a bicycle frame include steel, aluminum, titanium and carbon fiber, although other materials may be used.

Frame 12 includes a down tube 14, a seat tube 16 intersecting a lower portion of the down tube at a bottom bracket region 18, a pair of chain stays 20 each extending backward from the bottom bracket region to a rear wheel dropout 22, and a pair of seat stays 24 each extending generally upward and forward from a corresponding one of the rear wheel dropouts to intersect the seat tube. The frame further includes a head tube 26 having a lower portion 28 that intersects an upper portion 30 of the down tube and which is configured to receive a steerer tube of a bicycle fork 32, and an upper portion 34 which is configured to receive a stem of a bicycle handlebar 36. In other words, down tube 14 extends generally downward and rearward from the lower portion of the head tube.

In addition, frame 12 includes a first or lower top tube 38 extending between either the lower portion of the head tube or an upper portion of the down tube and the seat tube, and a second or upper top tube 40 extending between the upper portion of the head tube and the seat tube. More generally, the upper top tube extends generally rearward from an upper portion of the head tube, and the lower top tube extends rearward from a portion of the frame below the upper top tube. Whether this portion of the frame is the lower portion of the head tube or an upper portion of the down tube is a matter of design choice that typically depends on the overall frame size. As depicted in FIG. 1, seat tube 16 intersects each of upper top tube 40, lower top tube 38 and down tube 14.

As also depicted, for example, in FIG. 1, top tubes 38 and 40 each may be configured to hold a battery or a battery pack for powering an electric motor of bicycle 10. For instance, each top tube may contain a plurality of battery cells connected in series to form batteries 42, 44, which are inserted into the top tubes.

Also as depicted in FIG. 1, top tubes 38 and 40 each extend rearward of seat tube 16 to some extent, i.e. beyond its intersection with the seat tube. This allows an electronics housing 50 to be disposed rearward of the seat tube, between the first and second (i.e., upper and lower) top tubes. In other cases, the electronics housing may be disposed in front of the seat tube, but still between the top tubes. In still other cases, the controlling electronics may be disposed elsewhere than in a housing between the top tubes, such as in a bag that may be removably attached to a portion of the bicycle frame or to a rack. When electronics housing 50 is disposed at the rear of the frame as in FIG. 1, a rearward portion of the housing may include one or more lights, such as integrated safety lights 51 configured to receive power from the batteries stored within the frame.

Electronics housing 50 is configured to be electrically connected to batteries 42, 44 stored within the top tubes. Specifically, in the embodiment depicted in FIGS. 1-4, upper and lower battery end caps 52, 54 are provided and configured to fit around seat tube 16 and each to provide an electrical conduit, generally indicated at 56, 58 in FIG. 4, between a respective one of the batteries and electronics housing 50. Conduits 56, 58 each include a pair of detents indicated at 60, 62 formed in opposing lateral sides of the respective battery end cap and configured to allow passage of wires from the battery to the electronics housing. For example, substantially flat wires 64, 66 are shown passing through detents 60, 62 in FIG. 4. Another similar wire (not shown) passes through a similar detent on the opposing lateral side of each battery end cap and carries the opposite electrical polarity.

Figure 4:
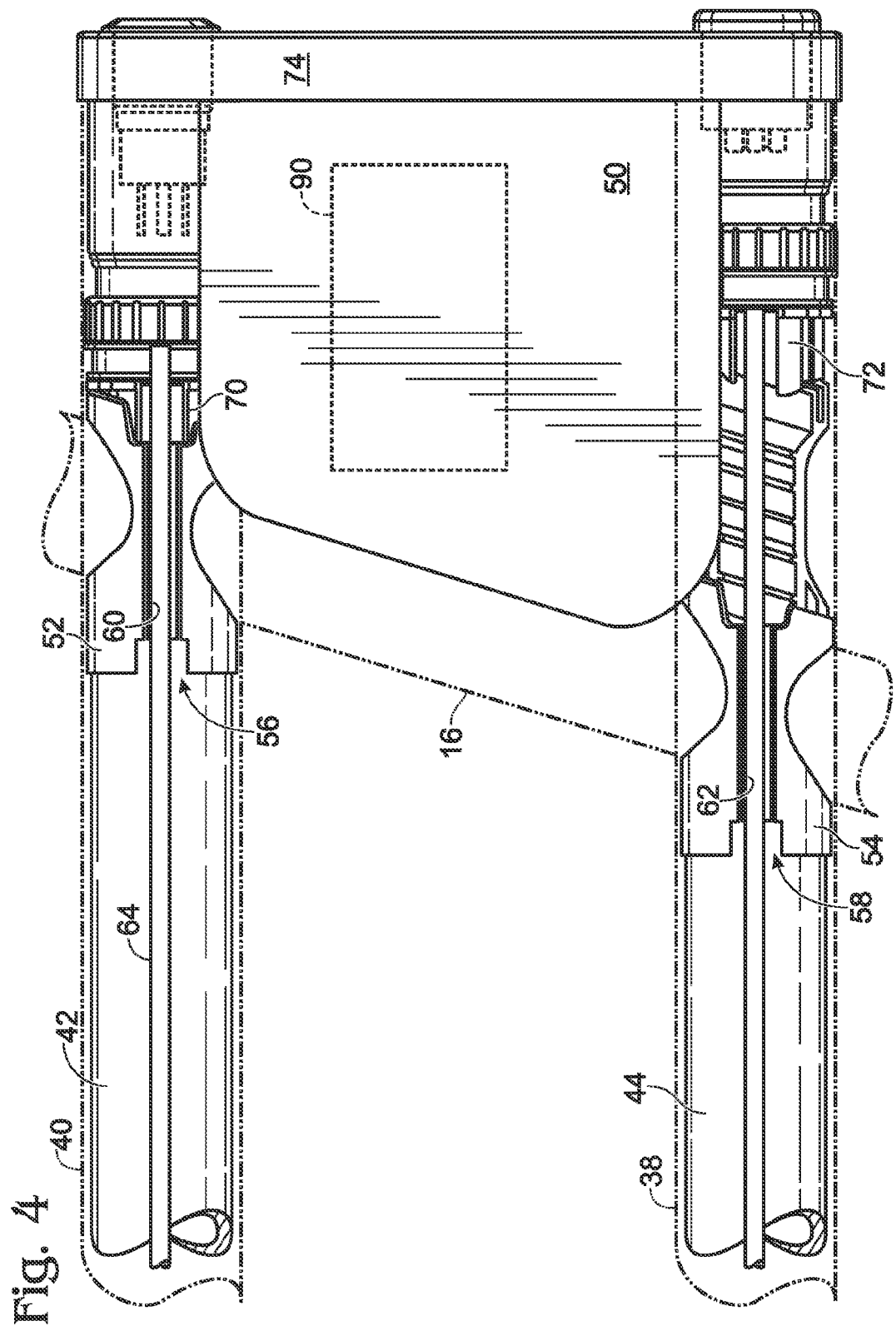
FIG. 4 is a semi-transparent side elevational view of the electronics housing of FIG. 3, showing details of battery end caps disposed within the housing and facilitating electrical connection between the bicycle batteries and the electronics housing.

In other cases, an electrical conduit between each battery and the electronics housing may be formed in some other manner, such as by passing a wire through or around the seat tube, with or without the use of a battery end cap of the type shown in FIG. 4. Furthermore, according to the present teachings, conduits provided by battery end caps need not be configured to accommodate flat wires, but instead may have any other shape configured to accommodate electrical connectors of any desired type, such as cylindrical wires.

Electronics housing typically includes upper and lower "male" electrical plugs 70, 72, which are configured to form an electrical connection with a respective one of the battery end caps by interfacing with a corresponding "female" connector in each end cap. Other forms of electrical connection between the electronics housing and the battery end caps are possible, including reversing the disposition of the "male" and "female" connectors, or eliminating those connectors entirely and instead using some other form of electrical connection, such as banana plugs, or simply wiring the batteries directly to the electronics housing. However, the plug configuration depicted in FIG. 4 allows convenient installation and removal of the electronics housing from the electric bicycle. Similarly, the electronics housing itself may include a removable rear portion 74, within which one or more lights such as light 51 may be disposed.

In addition to the various tubes described previously, bicycle 10 also will typically include various other parts of a working electric bicycle, such as a front fork 32 extending generally downward from the lower portion of the head tube and providing a pair of front wheel dropouts 82, a front wheel 84, and a rear wheel 86. Furthermore, the electric bicycle will include an electric motor (not shown) attached to some portion of the bicycle drive train, such as to the front wheel hub, rear wheel hub, or bottom bracket, although other attachments are also possible.

The batteries stored in the top tubes are generally configured to provide locomotive power to the electric bicycle, typically through a power controller, generally indicated at 90, which is disposed in the electronics housing. Controller 90 is configured to provide power from the batteries to the motor of the bicycle according to a control algorithm. This can be accomplished through an electrical connection between the controller and the motor. This electrical connection may include wires disposed entirely within the bicycle frame, although in some cases one or more segments of wire may be disposed outside the frame.

Figure 5:
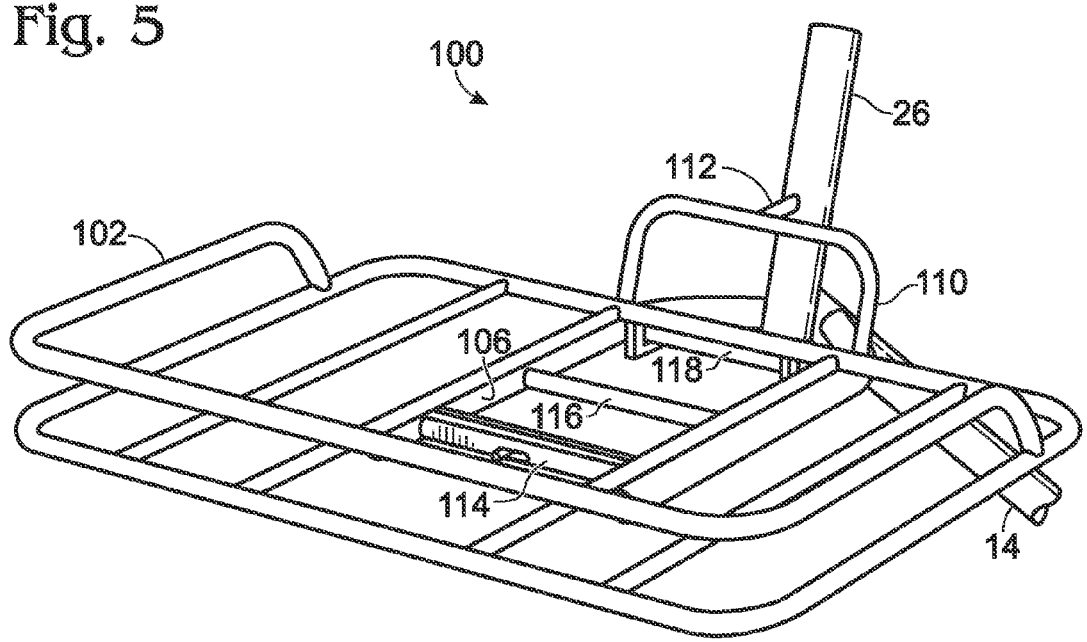
FIG. 5 is an isometric view of a front portion of the frame of the electric bicycle of FIGS. 1-2, showing further details of a front rack and a mounting portion of the bicycle frame that facilitates attachment of the front rack.
Figure 6:
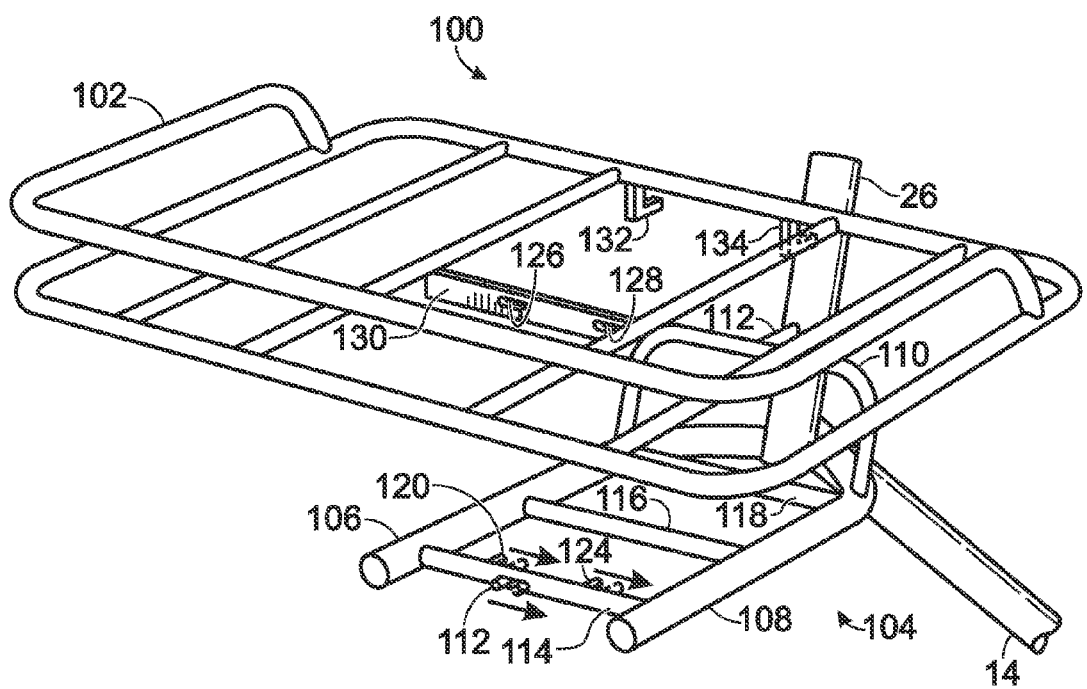
FIG. 6 is a partially exploded view similar to the view of FIG. 5, depicting the front rack disengaged from the bicycle frame.

FIGS. 5-6 depict close-up views of a rack system, generally indicated at 100, suitable for mounting a rack on the front portion of a bicycle such as electric bicycle 10. Rack system 100 includes a rack 102 that is configured to connect with an integrated mounting portion 104 of bicycle frame 12. In FIGS. 5-6, mounting portion 104 takes the form of a pair of substantially horizontal mounting tubes 106, 108 connected to down tube 14 on opposing lateral sides of the down tube. An angled bridge portion 110 connects the horizontal mounting tubes to head tube 26 via a connecting tube 112 that passes between a central portion of the head tube and bridge portion 110. Three transverse tubes 114, 116, 118 provide additional structural integrity to mounting portion 104 and provide an attachment mechanism for rack 102, as described in more detail below.

More specifically, as can be seen in FIG. 6, transverse tube 114 includes a plurality of movable protrusions 120, 122, 124, all of which are attached to a spring-biased member (not shown) that can slide within transverse tube 114. As indicated by the arrows in FIG. 6, these three protrusions may be slid from left to right in order to engage the rear protrusions 120, 124 with complementary slots 126, 128 in a connection member 130 of rack 102. This is typically done by a user by manually moving front protrusion 122, which causes the spring-biased member and thus the rear protrusions also to move. In addition, rack 102 includes L-shaped brace members 132, 134 configured to fit under transverse tube 118 of mounting portion 104.

To engage the rack with the mounting portion, a user angles the rack slightly downward, fits brace members 132, 134 under transverse tube 118, lowers the rack toward the horizontal, slides protrusion 122 to the right causing protrusions 120, 124 also to move toward the right, engages protrusions 120, 124 with complementary slots 126, 128 of connection member 130, lowers the rack to a completely horizontal position, and then releases protrusion 122, allowing spring-biased protrusions 120, 124 to slide back toward the left within slots 126, 128. At this point, rack 102 will be securely engaged with mounting portion 104 by the combination of brace members 132, 134 disposed under transverse tube 118, and protrusions 120, 124 engaged within slots 126, 128.

Although a specific attachment mechanism for mounting rack 102 to mounting portion 104 is shown in FIGS. 5-6 and described above, the present teachings contemplate more general attachment mechanisms. For example, any number of attachment protrusions may be used, rather than exactly two for engaging the rack and one for providing manual input from a user. Furthermore, the size and shape of these protrusions, and of the mechanism that allows a user to move the protrusions, may be varied. In addition, the protrusions themselves may be located on either the mounting portion of the frame (as shown in FIGS. 5-6) or on the rack itself (not shown), in which case the complementary slots will be disposed on the mounting portion of the frame.

Generally speaking, any number, size or shape of mounting protrusions may be used and disposed either on the rack itself or the mounting portion of the frame, in conjunction with complementary slots or apertures of suitable design. Similarly, different, sizes, shapes and numbers of brace members may be used, and in some cases no brace members at all may be used, in which case another set of mounting protrusions and complementary apertures may be used instead. The mounting protrusions need not be spring biased, but in some cases instead may be biased toward or otherwise securable in a mounting position by some other suitable mechanism.

The present teachings also contemplate that the attachment mechanism used to engage rack 102 with frame mounting portion 104 may be used to attach things other than rack 102 to the bicycle. For example, the attachment mechanism may be used to attach racks of other sizes and/or styles, bags such as panniers, baskets, platforms, child-carrying seats or the like. In other words, frame mounting portion 104 may be configured with a universal interface that allows the secure attachment of a plethora of interchangeable accessories to the bicycle frame.

What is claimed is:
1. An electric bicycle, comprising:
 a frame, including:
  a head tube;

an upper top tube extending generally rearward from an upper portion of the head tube and containing a first battery;

a lower top tube extending generally rearward from a portion of the frame beneath the upper portion of the head tube, oriented substantially parallel to the first top tube and containing a second battery;

a down tube extending generally downward and rearward from the lower portion of the head tube;

a seat tube that intersects the upper top tube, the lower top tube and the down tube;

a fork extending generally downward from the lower portion of the head tube and providing a pair of front wheel dropouts;

a pair of seat stays extending generally downward and rearward from an upper portion of the seat tube; and a pair of chain stays extending generally rearward from a lower portion of the seat tube to form a pair of rear wheel dropouts in conjunction with the seat stays;

a front wheel;

a rear wheel; and an electronics housing disposed between the upper top tube and the lower top tube and rearward of the seat tube;

wherein the batteries are configured to provide locomotive power to the electric bicycle; and wherein each top tube extends rearward beyond its intersection with the seat tube.

2. The electric bicycle of claim 1, further comprising a controller configured to provide locomotive power from the batteries to the bicycle according to a control algorithm.

3. The electric bicycle of claim 2, wherein the controller is configured to provide locomotive power from the batteries to the bicycle through an electrical connection disposed entirely within the frame.

4. The bicycle of claim 1, wherein the upper top tube and the lower top tube are each substantially horizontal.

5. An electric bicycle, comprising:

a down tube;

a seat tube intersecting a lower portion of the down tube at a bottom bracket region;

a pair of chain stays each extending backward from the bottom bracket region to a rear wheel dropout;

a pair of seat stays each extending generally upward and forward from a corresponding one of the rear wheel dropouts to intersect the seat tube;

a head tube having a lower portion that intersects an upper portion of the down tube and which is configured to receive a bicycle fork steerer tube, and an upper portion which is configured to receive a bicycle handlebar stem;

a first top tube extending between either the lower portion of the head tube or an upper portion of the down tube and the seat tube;

a second top tube extending between the upper portion of the head tube and the seat tube; and an electronics housing disposed between the first and second top tubes and configured to be electrically connected to batteries stored within the top tubes;

wherein the first and second top tubes are each configured to hold a battery for powering an electric motor of the bicycle.

6. The electric bicycle of claim 5, wherein the electronics housing is disposed rearward of the seat tube, and further comprising at least one battery end cap configured to fit around the seat tube and to provide an electrical conduit between one of the batteries and the electronics housing.

7. The electric bicycle of claim 6, wherein the at least one battery end cap includes a pair of battery end caps each configured to provide an electrical conduit between a respective one of the batteries and the electronics housing.

8. The electric bicycle of claim 6, wherein the electrical conduit includes a pair of detents formed in opposing lateral sides of the battery end cap and configured to allow passage of wires from the battery to the electronics housing.

9. The electric bicycle of claim 8, wherein the wires are substantially flat.

10. The electric bicycle of claim 6, wherein a rearward portion of the electronics housing includes at least one integrated safety light configured to receive power from the batteries.

11. The bicycle of claim 5, wherein the first top tube and the second top tube are each substantially horizontal.

12. A bicycle frame for an electric bicycle, comprising:

a head tube;

an upper top tube extending generally rearward from an upper portion of the head tube;

a lower top tube extending generally rearward from a portion of the frame below the upper top tube and oriented substantially parallel to the upper top tube;

a down tube extending generally downward and rearward from the lower portion of the head tube;

a seat tube that intersects the upper top tube, the lower top tube and the down tube; and an electronics housing disposed between the upper top tube and the lower top tube and rearward of the seat tube;

wherein each top tube is configured to contain a battery for powering the bicycle; and wherein each top tube extends rearward beyond its intersection with the seat tube.

13. The bicycle frame of claim 12, further comprising upper and lower battery end caps each configured to fit around the seat tube and to provide an electrical conduit between a respective one of the batteries and the electronics housing.

14. The bicycle frame of claim 13, wherein the electronics housing includes upper and lower electrical plugs configured to form an electrical connection with a respective one of the battery end caps.

15. The bicycle frame of claim 13, wherein the battery end caps each include a pair of detents disposed on opposite sides of the seat tube and forming the electrical conduit.

16. The bicycle frame of claim 15, wherein the detents are configured to provide a passage for a pair of substantially flat wires connecting the respective one of the batteries to the electronics housing.

17. The bicycle frame of claim 12, wherein the upper top tube and the lower top tube are each substantially horizontal.

* * * * *